United States Patent
Low et al.

(10) Patent No.: US 11,155,368 B1
(45) Date of Patent: Oct. 26, 2021

(54) MULTIPLE THRUSTER FIRING ON A SINGLE ARTICULABLE MODULE

(71) Applicant: Space Systems/Loral, LLC, Palo Alto, CA (US)

(72) Inventors: Lenny Low, Hillsborough, CA (US); Jorge Delgado, Palo Alto, CA (US); Gordon Wu, Lafayette, CO (US); Maria Eugenia Torres, San Francisco, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 349 days.

(21) Appl. No.: 15/920,294

(22) Filed: Mar. 13, 2018

(51) Int. Cl.
*B64G 1/26* (2006.01)
*B64G 1/40* (2006.01)
*B64G 1/24* (2006.01)

(52) U.S. Cl.
CPC .............. *B64G 1/26* (2013.01); *B64G 1/242* (2013.01); *B64G 1/405* (2013.01)

(58) Field of Classification Search
CPC ........... B64G 1/405; B64G 1/406; B64G 1/26
See application file for complete search history.

(56) References Cited

U.S. PATENT DOCUMENTS

| | | |
|---|---|---|
| 4,010,921 A | 3/1977 | Pistiner et al. |
| 5,349,532 A | 9/1994 | Tilley et al. |
| 5,595,360 A | 1/1997 | Spitzer |
| 5,984,236 A | 11/1999 | Keitel et al. |
| 6,116,543 A | 9/2000 | Koppel et al. |
| 6,253,125 B1 | 6/2001 | Barker |
| 6,293,501 B1 | 9/2001 | Kurland |

(Continued)

FOREIGN PATENT DOCUMENTS

FR  2802575 A1  6/2001

OTHER PUBLICATIONS

Corey et al., "Performance and Evolution of Stationary Plasma Thruster Electric Propulsion for Large Communications Satellites," 28th AIAA International Communications Satellite Systems Conference (ICSSC-2010) Aug. 30-Sep. 2, 2010, Anaheim, California, American Insitute of Aeronautics and Astronautics, Inc., (2010) 20 pages.

*Primary Examiner* — Nicholas McFall
*Assistant Examiner* — Terri L Filosi
(74) *Attorney, Agent, or Firm* — Weaver Austin Villeneuve & Sampson LLP (57) ABSTRACT

A spacecraft includes a propulsion subsystem including at least two electric thrusters, an electrical interface assembly that couples electrical conductors from the thrusters to a spacecraft harness, a pneumatic interface assembly that controls flow rate of propellant to the thrusters and a thruster support module (TSM) including a pointing arrangement and a mounting arrangement. A proximal portion of the mounting arrangement is coupled with a distal portion of the pointing arrangement; the at least two electric thrusters are disposed on a distal portion of the mounting arrangement; the electrical interface assembly and the pneumatic interface assembly are disposed on the proximal portion of the mounting arrangement. The mounting arrangement is configured to limit heat transfer between the thrusters and (b) one or more of the proximal portion of the mounting arrangement, the electrical interface assembly and the pneumatic interface assembly.

19 Claims, 4 Drawing Sheets

(56) References Cited

U.S. PATENT DOCUMENTS

| | | | |
|---|---|---|---|
| 6,298,289 B1 * | 10/2001 | Lloyd | B64G 1/66 |
| | | | 701/13 |
| 6,305,646 B1 | 10/2001 | McAllister et al. | |
| 6,481,672 B1 | 1/2002 | Goodzeit et al. | |
| 6,543,723 B1 | 4/2003 | Oh | |
| 6,637,701 B1 | 10/2003 | Glogowski et al. | |
| 6,695,263 B1 | 2/2004 | Goodzeit | |
| 6,830,221 B1 * | 12/2004 | Janson | B64G 1/10 |
| | | | 244/158.1 |
| 7,113,851 B1 | 9/2006 | Gelon et al. | |
| 8,048,211 B2 | 11/2011 | Behruzi et al. | |
| 8,973,873 B2 | 3/2015 | Aston et al. | |
| 9,108,748 B2 | 8/2015 | Munir et al. | |
| 9,114,890 B1 | 8/2015 | Campbell et al. | |
| 9,522,746 B1 | 12/2016 | Ih et al. | |
| 9,546,892 B2 | 1/2017 | Kwok | |
| 9,663,251 B2 | 5/2017 | Munir et al. | |
| 9,796,486 B1 * | 10/2017 | Illsley | B64G 1/26 |
| 2003/0005708 A1 | 1/2003 | Beck et al. | |
| 2010/0179711 A1 | 7/2010 | Munir | |
| 2012/0097796 A1 | 4/2012 | Munir et al. | |
| 2012/0097797 A1 | 4/2012 | Woo et al. | |
| 2016/0176545 A1 * | 6/2016 | Munir | B64G 1/26 |
| | | | 244/158.6 |
| 2016/0368624 A1 | 12/2016 | Hruby et al. | |
| 2017/0129627 A1 | 5/2017 | Moro et al. | |

* cited by examiner

MULTIPLE THRUSTER FIRING ON A SINGLE ARTICULABLE MODULE

TECHNICAL FIELD

This invention relates generally to spacecraft and, in particular, to techniques for simultaneous firing of multiple spacecraft thrusters disposed on a single articulable module.

BACKGROUND

The assignee of the present invention manufactures and deploys spacecraft for, inter alia, communications and broadcast services.

Such spacecraft are equipped with on board propulsion systems, including chemical or electric thrusters, for orbit raising from a launch vehicle transfer orbit (or "parking orbit") to an operational orbit, for example, to a geosynchronous orbit; for station keeping once disposed in the operational orbit; and for attitude control/momentum management purposes.

Electric thrusters disposed on an articulable mechanism such as disclosed in U.S. Pat. No. 9,663,251, assigned to the assignee of the present invention, may be used in order to reposition the electric thrusters diverse functions, including orbit raising, station-keeping, and to track the spacecraft center of mass over life. Typically, there are two thrusters at the end of the mechanism (a primary and redundant thruster). In the absence of the presently disclosed techniques, only one thruster may be fired at a time, due to thermal constraints.

SUMMARY

According to some implementations, a propulsion system, arranged on a spacecraft, includes at least two electric thrusters, an electrical interface assembly that couples electrical conductors from the thrusters to a spacecraft harness, a pneumatic interface assembly that receives propellant from propellant storage arrangement on the spacecraft and controls flow rate of the propellant to the thrusters, and a thruster support module (TSM), the TSM including a pointing arrangement and a mounting arrangement. A proximal portion of the mounting arrangement is coupled with the pointing arrangement. The at least two electric thrusters are disposed on a distal portion of the mounting arrangement. The electrical interface assembly and the pneumatic interface assembly are disposed on the proximal portion of the mounting arrangement. The pointing arrangement includes at least one revolute joint configured to articulate the mounting arrangement in a plane of rotation over a range of motion about a first axis of at least 90 degrees. The mounting arrangement is configured to limit heat transfer between (a) the distal portion of the mounting arrangement and the at least two electric thrusters, and (b) one or more of the proximal portion of the mounting arrangement, the electrical interface assembly and the pneumatic interface assembly.

In some examples, each thruster may be a Hall Effect thruster with a nominal full power rating of at least 4000 W, and the mounting arrangement may be configured such that during simultaneous operation of both thrusters at the nominal full power rating, upper temperature limits of the pneumatic interface assembly and electrical interface assembly are not exceeded. In some examples, the at least two electric thrusters may be configured to accelerate ions generally along a thrust vector aligned with a first direction and the mounting arrangement may be configured to conduct a first portion of waste heat from a mounting plate of each thruster to a surface of the mounting arrangement that is approximately parallel to the thrust vector such that the first portion of the waste heat is radiated to space in a direction approximately transverse to the thrust vector. In some examples, the mounting arrangement may be configured to provide a view to space from a back side of the thruster such that a second portion of the waste heat is radiated to space in a direction generally opposite to the first direction.

In some examples, a normal to the plane of rotation may be approximately orthogonal to a line between extending from the proximal portion of the mounting arrangement to the distal portion of the mounting arrangement.

In some examples, the pneumatic interface assembly may be disposed between the electrical interface assembly and the pointing arrangement.

In some examples, the electrical interface assembly may be disposed between the pneumatic interface assembly and the pointing arrangement.

In some implementations, a spacecraft includes a propulsion subsystem, a power subsystem and an attitude control subsystem, the propulsion subsystem including a propellant storage arrangement, at least two electric thrusters, an electrical interface assembly that couples electrical conductors from the thrusters to a spacecraft harness, a pneumatic interface assembly that receives propellant from the propellant storage arrangement and controls flow rate of the propellant to the thrusters and a thruster support module (TSM), the TSM including a pointing arrangement and a mounting arrangement. A proximal portion of the pointing arrangement is fixedly attached to a main body structure of the spacecraft. A proximal portion of the mounting arrangement is coupled with a distal portion of the pointing arrangement. The at least two electric thrusters are disposed on a distal portion of the mounting arrangement. The electrical interface assembly and the pneumatic interface assembly are disposed on the proximal portion of the mounting arrangement. The pointing arrangement includes at least one revolute joint configured to articulate the mounting arrangement in a plane of rotation over a range of motion about a first axis of at least 90 degrees. The mounting arrangement is configured to limit heat transfer between (a) the distal portion of the mounting arrangement and the at least two electric thrusters, and (b) one or more of the proximal portion of the mounting arrangement, the electrical interface assembly and the pneumatic interface assembly.

In some examples, the electrical interface assembly may be electrically coupled with one or both of the power subsystem and the attitude control subsystem.

In some examples, the propellant storage arrangement may be disposed within the main body structure of the spacecraft and is pneumatically coupled with the pneumatic interface assembly.

In some examples, each thruster may be a Hall Effect thruster with a nominal full power rating of at least 4000 W, and the mounting arrangement may be configured such that during simultaneous operation of both thrusters at the nominal operating power, upper temperature limits of the pneumatic interface assembly and electrical interface assembly are not exceeded. In some examples, the at least two electric thrusters are configured to accelerate ions generally along a thrust vector aligned with a first direction and the mounting arrangement may be configured to conduct a first portion of waste heat from a mounting plate of each thruster to a surface of the mounting arrangement that is approximately parallel to the thrust vector such that the first portion of the waste heat is radiated to space in a direction approximately transverse to the thrust vector. In some examples, the mounting arrangement may be configured to provide a view to space from a back side of the thruster such that a second portion of the waste heat is radiated to space in a direction generally opposite to the thrust vector.

In some examples, a normal to the plane of rotation may be approximately orthogonal to a line between extending from the proximal portion of the mounting arrangement to the distal portion of the mounting arrangement.

In some examples, the pneumatic interface assembly may be disposed between the electrical interface assembly and the pointing arrangement.

In some examples, the electrical interface assembly may be disposed between the pneumatic interface assembly and the pointing arrangement.

In some implementations, a method includes operating an orbiting spacecraft and performing an orbit transfer maneuver, the spacecraft including a propulsion subsystem, a power subsystem and an attitude control subsystem, the propulsion subsystem including at least two electric thrusters, an electrical interface assembly that couples electrical conductors from the thrusters to a spacecraft harness, a pneumatic interface assembly that receives propellant from propellant tankage on the spacecraft and controls flow rate of the propellant to the thrusters and an articulable thruster support module (TSM), the TSM including a pointing arrangement and a mounting arrangement. The at least two electric thrusters are disposed on a distal portion of the mounting arrangement. The performing the orbit transfer maneuver includes simultaneously firing the at least two electric thrusters for a period of time not less than ten minutes at a duty cycle greater than 50%.

In some examples, a proximal portion of the mounting arrangement may be coupled with the pointing arrangement, the electrical interface assembly and the pneumatic interface assembly may be disposed on the proximal portion of the mounting arrangement. The pointing arrangement may include at least one revolute joint configured to articulate the mounting arrangement in a plane of rotation over a range of motion about a first axis of at least 90 degrees. The mounting arrangement may be configured to limit heat transfer between (a) the distal portion of the mounting arrangement and the at least two electric thrusters, and (b) one or more of the proximal portion of the mounting arrangement, the electrical interface assembly and the pneumatic interface assembly. In some examples, each thruster may be a Hall Effect thruster with a nominal full power rating of at least 4000 W, and the mounting arrangement may be configured such that during simultaneous operation of both thrusters at the nominal full power rating of at least 4000 W, upper temperature limits of the pneumatic interface assembly and electrical interface assembly are not exceeded. In some examples, the at least two electric thrusters may be configured to accelerate ions generally along a thrust vector aligned with a first direction. The mounting arrangement may be configured to conduct a first portion of waste heat from a mounting plate of each thruster to a surface of the mounting arrangement that is approximately parallel to the thrust vector such that the first portion of the waste heat is radiated to space in a direction approximately transverse to the thrust vector. The mounting arrangement may be configured to provide a view to space from a back side of the thruster such that a second portion of the waste heat is radiated to space in a direction generally opposite to the thrust vector.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The presently disclosed techniques permit simultaneous operation of two or more high power electric thrusters, each electric thruster being disposed on a common thermal/structural mounting arrangement.

An electric thruster, as contemplated by the present disclosure, may be or include, for example, a Hall accelerator, a gridded electrostatic accelerator, a cross field (ExB) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle. In some implementations, the electric thruster may be Hall Effect thrusters (HET) such as a stationary plasma thruster (SPT).

In some implementations, the electric thruster may be a high power HET with a nominal full power rating of 4000 watts or more, such as the SPT-140 manufactured by OKB Fakel of Kaliningrad, Russia, the BHT-8000 manufactured by Busek Co. of Natick, Mass., and the PPS 5000 manufactured by Safran of Vernon, France, for example. Such thrusters, when operating at the nominal full power rating of 4000 watts or more, may each dissipate over 2000 watts of waste heat. The thermal/structural mounting arrangement may be arranged to safely dissipate the waste heat of at least two simultaneously operating thrusters.

Figure 1:
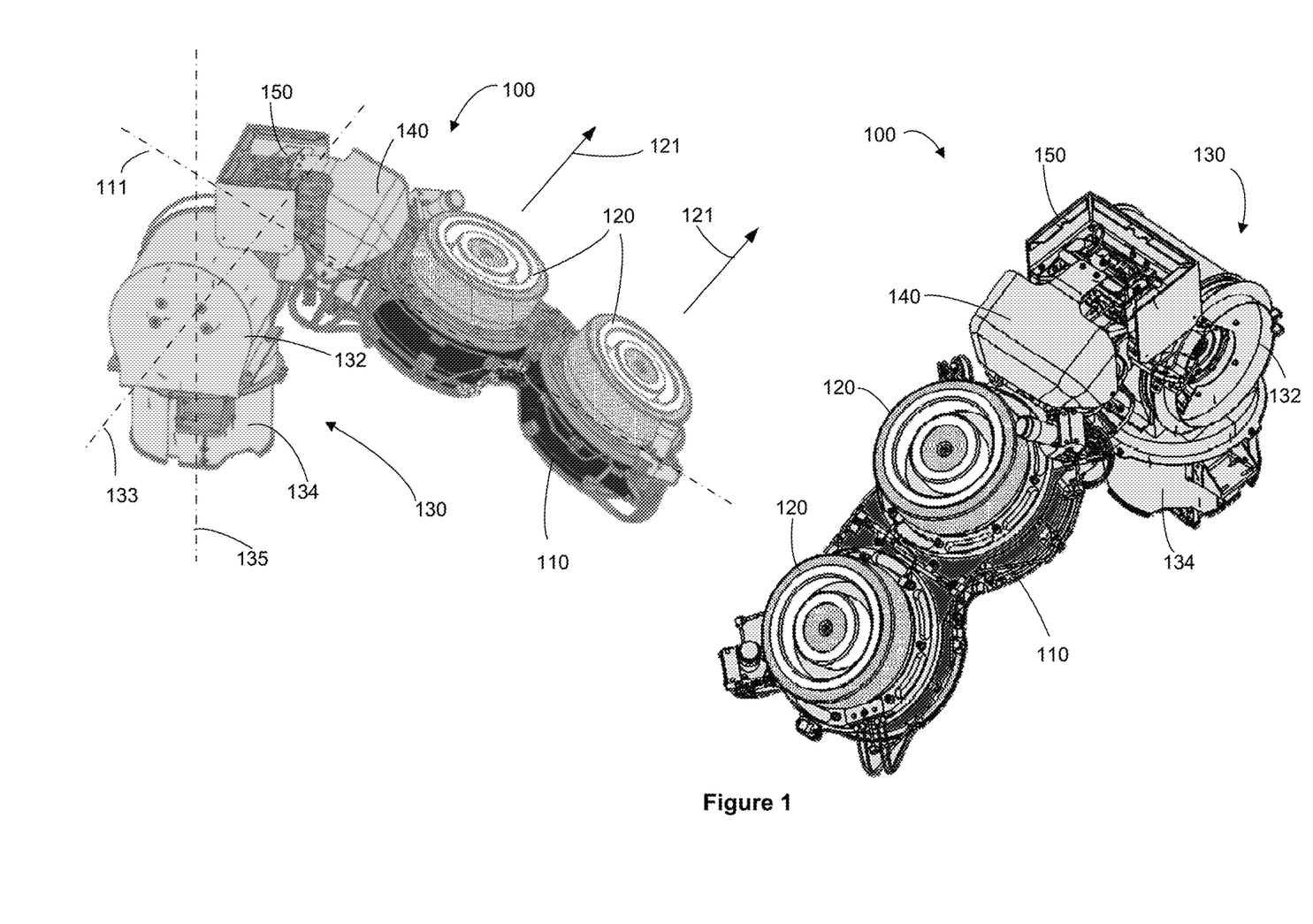
FIG. 1 illustrates an example of an articulable thruster support module, according to an implementation.

An example implementation is illustrated in FIG. 1, which depicts two views of an articulable thruster support module (TSM) 100. Each TSM 100 includes a thermal/structural mounting arrangement 110. Two thrusters 120 are disposed proximate to a distal portion of the mounting arrangement 110. A proximal portion of the mounting arrangement 110 is coupled with a structural feature of a spacecraft main body (not illustrated) by way of a pointing arrangement 130. In the illustrated example, the pointing arrangement 130 includes two revolute joints, a first revolute joint 132 and a second revolute joint 134. The illustrated pointing arrangement 130 provides two-axis articulation, more specifically articulation about a first axis 133 and a second axis 135 that may be approximately orthogonal to the first axis 133. One, three, or more axes of articulation are also contemplated by the present disclosure. The range of motion about the first axis 133 may exceed 90°. In some implementations, the range of motion about the first axis 133 is at least 120°. In some implementations, the first revolute joint 132 may be configured to articulate the mounting arrangement 110 in a plane of rotation, a normal to the plane of rotation being approximately orthogonal to a line 111 between extending from the proximal portion of the mounting arrangement 110 to the distal portion of the mounting arrangement 110.

The TSM 100 also includes, coupled with a proximal portion of the mounting arrangement 110, an electrical interface assembly 140 and a pneumatic interface assembly 150. The electrical interface assembly 140 may include electrical and thermal-mechanical couplings between high temperature electrical conductors terminating at a thruster 120 and detachable connectors coupling with a spacecraft electrical harness (not illustrated). The pneumatic interface assembly 150 may include a xenon flow controller (XFC) that regulates a flow rate of gaseous xenon to a thruster 120. It may be necessary to control a respective temperature of the electrical interface assembly 140 and of the pneumatic interface assembly 150 within a temperature range(s) substantially narrower than the thrusters 120. In particular, the electrical interface assembly 140 and the pneumatic interface assembly 150 may have an upper temperature limit substantially below the expected baseplate operating temperature of a thruster 120. Accordingly, the mounting arrangement 110 may be configured to limit heat transfer between the distal portion of the mounting arrangement 110 and the proximal portion of the mounting arrangement 110 and/or between the proximal portion of the mounting arrangement 110 and one or both of the electrical interface assembly 140 and the pneumatic interface assembly 150.

During operation, each thruster 120 may consume 4KW or more or electrical power, a portion of which is used to generate thrust. More particularly, the power may be used to ionize propellant and to accelerate the ionized propellant to produce a thrust vector in a first direction 121. High power electric thrusters contemplated by the present disclosure may have a typical electrical efficiency of about 50%. Accordingly, during simultaneous operation of both thrusters 120, about 4KW of waste heat must be accommodated. The mounting arrangement 110 may be configured such that a large fraction of the 4KW of waste heat is dissipated to space in directions, with respect to the first direction 121, ranging from 90 to 180°. More particularly, in the illustrated implementation, the mounting arrangement 110 is configured to conduct a first portion of waste heat from a mounting plate of the thruster 120 to a surface of the mounting arrangement 110 from which the heat may be radiated to space in a direction approximately transverse to the first direction 121. The mounting arrangement 110 may be configured to allow a second portion of waste heat to be radiated directly to space from a back side of the thruster 120 in a direction generally opposite to the first direction 121.

Figure 2:
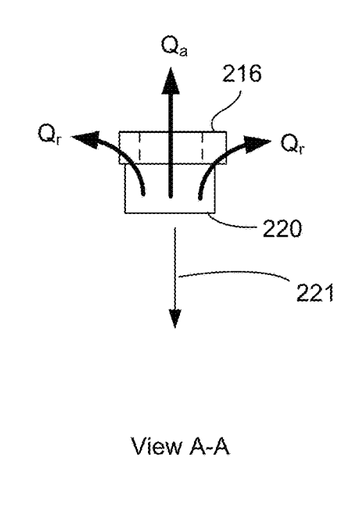
FIG. 2 illustrates an example of a spacecraft including a thruster support module, according to an implementation.

FIG. 2 illustrates an example of a spacecraft including a thruster support module, according to an implementation. In the illustrated example, a spacecraft 2000 includes a propulsion subsystem, including propellant storage arrangement 2300, an attitude control subsystem 2400, a power subsystem 2500 and at least one thruster support module (TSM) 200, including a thermal/structural mounting arrangement 210 and a pointing arrangement 230.

In the illustrated implementation, the propulsion system includes two electric thrusters 220, an electrical interface assembly 240 and a pneumatic interface assembly 250, each mechanically coupled with the mounting arrangement 210. Electric thrusters 220, advantageously, may be disposed on and thermally coupled with a distal portion 216 of the mounting arrangement 210. In some implementations, a proximal portion 214 of the mounting arrangement 210 may be mechanically coupled with the distal portion 216 by a first coupling arrangement 215. The first coupling arrangement 215 may be configured to limit thermal conductivity between the distal portion 216 of the mounting arrangement 210 and the proximal portion 214 of the mounting arrangement 210.

In some implementations, the proximal portion 214 is mechanically coupled with one or both of the electrical interface assembly 240 and the pneumatic interface assembly 250 by additional coupling arrangements configured to limit thermal conductivity between the proximal portion 214 and one or both of the electrical interface assembly 240 and the pneumatic interface assembly 250. In the illustrated implementation, for example, a standoff 218 is disposed between the proximal portion 214 and the electrical interface assembly 240. The standoff 218 may be configured to provide a structural/mechanical coupling between the proximal portion 214 and the electrical interface assembly 240 while limiting heat transfer between the proximal portion 214 and the electrical interface assembly 240. Similarly, in the illustrated implementation, a standoff 219 is disposed between the proximal portion 214 and the pneumatic interface assembly 250. The standoff 219 may be configured to provide a structural/mechanical coupling between the proximal portion 214 and the pneumatic interface assembly 250 while limiting heat transfer between the proximal portion 214 and the pneumatic interface assembly 250.

The electrical interface assembly 240 may be configured as a connection point for coupling electrical conductors 260 leading from the thrusters 220 with spacecraft electrical harness (not illustrated). The electrical conductors 260 may be configured to withstand high temperatures associated with operation of the thrusters 220. The spacecraft electrical harness, on the other hand, as well as electrical interface assembly 240, may be damaged by temperatures that are substantially lower than those which the electrical conductors 260 may be configured to withstand.

The pneumatic interface assembly 250 may be configured to receive propellant from propellant storage 2300 and to control flow rate of the propellant to the thrusters 220. In some implementations, for example, the pneumatic interface assembly 250 may include a thermothrottle (not illustrated) or other commandably variable flow control device. The pneumatic interface assembly 250 may be pneumatically coupled with the thrusters 220 by way of propellant lines 270. The propellant lines 270 may be configured to withstand high temperatures associated with operation of the thrusters 220. The pneumatic interface assembly 250, on the other hand, may be configured to be operable only at or below maximum temperatures that are substantially lower than those which the propellant lines 270 may be configured to withstand.

In the illustrated implementation, the proximal portion 214 of the mounting arrangement 210 is coupled with the pointing arrangement 230 which includes a first revolute joint 232 and a second joint 234. The first revolute joint 232 may be configured to articulate the mounting arrangement 210 in a plane of rotation over a range of motion of at least 90 degrees.

The distal portion 216 of the mounting arrangement 210 may, advantageously, be configured such that waste heat from the thrusters 220 is conductively coupled into the distal portion 216 of the mounting arrangement 210 and then radiated to space. In some implementations, the mounting arrangement is configured to provide a highly conductive thermal interface with a mounting interface of each thruster 210. As may be better observed in View A-A, the distal portion 216 of the mounting arrangement 210 may be configured to conduct a first portion of waste heat ($Q_r$) from the mounting interface of each thruster to a surface of the distal portion 216 that is approximately parallel to a thrust vector 221. As a result, $Q_r$ may be radiated to space in a radial direction (normal to the surface of the distal portion 216) that is approximately transverse to the direction of the thrust vector 221. In some implementations, referring still to View A-A, the distal portion 216 of the mounting arrangement 210 may be configured to provide a view to space from a back side of the thruster such that a second portion of waste heat ($Q_a$) is radiated to space in an axial direction that is generally opposite to the thrust vector 221. For example, the distal portion 216 may include a cut-out such that a substantial portion of the back side of the thruster has a direct view to space.

Figure 3:
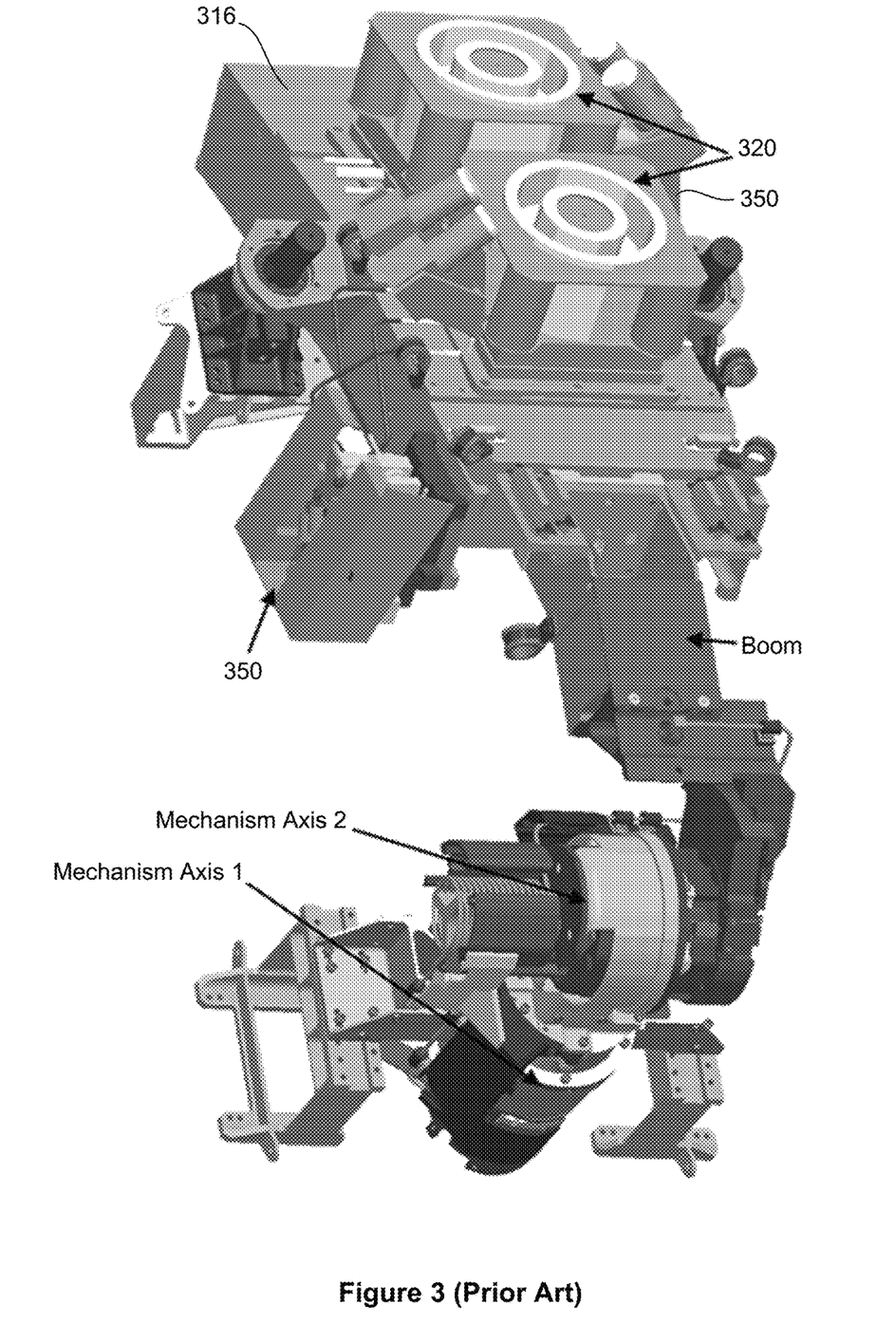
FIG. 3, illustrates a deployment and positioning mechanism actuated SPT module (DSM) configured in the absence of the presently disclosed techniques.

Features and benefits of the present invention may be better appreciated by referring to FIG. 3, which illustrates a deployment and positioning mechanism actuated SPT module (DSM) configured in the absence of the presently disclosed techniques (as described in Corey, et al., Performance and Evolution of Stationary Plasma Thruster Electric Propulsion for Large Communications Satellites, AIAA 2010-8688). As illustrated in FIG. 3, among other differences with the present disclosure, a radiator plate 316 on which thrusters 320 are mounted is configured to dissipate waste heat primarily in a direction parallel with the thrust axis, and is able to dissipate heat from only a single thruster firing at a time. Moreover, each XFC 350 is disposed on the radiator plate 316 proximate to a respective thruster 320.

The presently disclosed techniques enable simultaneous operation of two electric thrusters at a high duty cycle (50-100%, for example) for a substantial period of time (ten or more minutes, for example). During such a period of time, the baseplate operating temperature of the thrusters may rise to a value substantially higher than allowable temperatures of any or all of the electrical interface assembly, spacecraft electrical harness, and the pneumatic interface assembly each of which is disposed, together with the thrusters, on an articulable module. By configuring the articulable module to include a mounting arrangement that limits heat transfer from (i) the portion of the module proximate to the electric thrusters to (ii) the electrical interface assembly, spacecraft electrical harness, and the pneumatic interface assembly, steady state or near steady state (duty cycle >90%, for example) simultaneous operation of two or more high power electric thrusters may be accommodated without overheating the electrical interface assembly, spacecraft electrical harness, and the pneumatic interface assembly.

Figure 4:
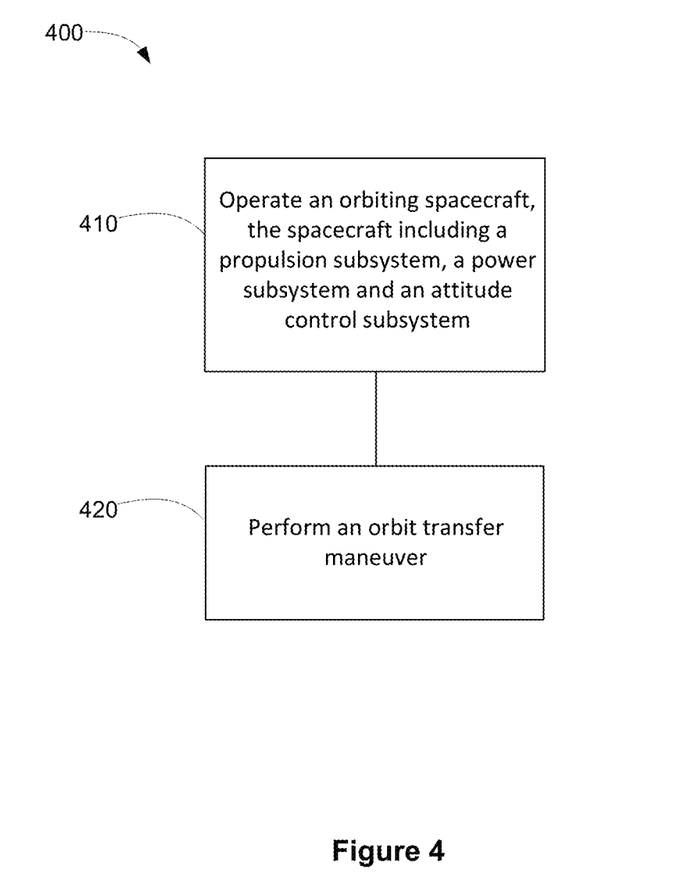
FIG. 4 illustrates a process flow diagram for performing an orbit transfer maneuver of an orbiting spacecraft, in accordance with an implementation.

FIG. 4 illustrates a process flow diagram for performing an orbit transfer maneuver of an orbiting spacecraft, in accordance with an implementation. The method 400 may start, at block 410 with operating an orbiting spacecraft, the spacecraft including a propulsion subsystem, a power subsystem and an attitude control subsystem. As described hereinabove, the propulsion subsystem may include at least two electric thrusters, an electrical interface assembly that couples electrical conductors from the thrusters to a spacecraft harness, a pneumatic interface assembly that receives propellant from propellant tankage on the spacecraft and controls flow rate of the propellant to the thrusters, and an articulable thruster support module (TSM). The TSM includes a pointing arrangement and a mounting arrangement, and the at least two electric thrusters are disposed on a distal portion of the mounting arrangement.

The method 400 may finish, at block 420, with performing an orbit transfer maneuver. Performing the orbit transfer maneuver may include simultaneously firing the at least two electric thrusters for a period of time not less than 10 minutes at a duty cycle of at least 50%.

Thus, techniques for simultaneously firing multiple spacecraft thrusters disposed on a single articulable module have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A propulsion system, arranged on a spacecraft, the propulsion system comprising:
   at least two electric thrusters, each having a full power rating of at least 4000 watts;
   an electrical interface assembly that couples electrical conductors from the thrusters to a spacecraft harness;
   a pneumatic interface assembly that receives propellant from propellant storage arrangement on the spacecraft and controls flow rate of the propellant to the thrusters; and
   a thruster support module (TSM), the TSM including a pointing arrangement and a mounting arrangement, the mounting arrangement including a proximal portion, a distal portion and one or more heat transfer limiting features, wherein:
      the at east two electric thrusters are disposed on the distal portion of the mounting arrangement;
      the pointing arrangement includes at least one revolute joint configured to articulate the mounting arrangement in a plane of rotation over a range of motion about a first axis of at least 90 degrees; and
      the one or more heat transfer limiting features are configured such that, while performing an orbit transfer maneuver by simultaneously firing the at least two electric thrusters for a period of time not less than ten minutes at the full power rating and a duty cycle greater than 50%, upper temperature limits of the pneumatic interface assembly and electrical interface assembly are not exceeded.

2. The propulsion system of claim 1, wherein each thruster is a Hall Effect thruster.

3. The propulsion system of claim 1, wherein:
   the at least two electric thrusters are configured to accelerate ions generally along a thrust vector aligned with a first direction; and
   the mounting arrangement is configured to conduct a first portion of waste heat from a mounting plate of each thruster to a surface of the mounting arrangement that is approximately parallel to the thrust vector such that the first portion of the waste heat is radiated to space in a direction approximately transverse to the thrust vector.

4. The propulsion system of claim 3, wherein: the mounting arrangement is configured to provide a view to space from a back side of the thruster such that a second portion of the waste heat is radiated to space in a direction generally opposite to the first direction.

5. The propulsion system of claim 1, wherein a normal to the plane of rotation is approximately orthogonal to a line between extending from the proximal portion of the mounting arrangement to the distal portion of the mounting arrangement.

6. The propulsion system of claim 1, wherein the pneumatic interface assembly is disposed between the electrical interface assembly and the pointing arrangement.

7. The propulsion system of claim 1, wherein the electrical interface assembly is disposed between the pneumatic interface assembly and the pointing arrangement.

8. A spacecraft, comprising:
a propulsion subsystem, a power subsystem and an attitude control subsystem, the propulsion subsystem including:
a propellant storage arrangement;
at least two electric thrusters, each having a full power rating of at least 4000 watts;
an electrical interface assembly that couples electrical conductors from the thrusters to a spacecraft harness;
a pneumatic interface assembly that receives propellant from the propellant storage arrangement and controls flow rate of the propellant to the thrusters; and
a thruster support module (TSM), the TSM including a pointing arrangement and a mounting arrangement, the mounting arrangement including a proximal portion, a distal portion and one or more heat transfer limiting features, wherein:
a proximal portion of the pointing arrangement is fixedly attached to a main body structure of the spacecraft;
the proximal portion of the mounting arrangement is coupled with a distal portion of the pointing arrangement;
the at least two electric thrusters are disposed on the distal portion of the mounting arrangement;
the pointing arrangement includes at least one revolute joint configured to articulate the mounting arrangement in a plane of rotation over a range of motion about a first axis of at least 90 degrees; and
the one or more heat transfer limiting features are configured such that, while performing, an orbit transfer maneuver by simultaneously firing the at least two electric thrusters for a period of time not less than ten minutes at the full power rating and a duty cycle greater than 50%, upper temperature limits of the pneumatic interface assembly and electrical interface assembly are not exceeded.

9. The spacecraft of claim 8, wherein the electrical interface assembly is electrically coupled with one or both of the power subsystem and the attitude control subsystem.

10. The spacecraft of claim 8, wherein the propellant storage arrangement is disposed within the main body structure of the spacecraft and is pneumatically coupled with the pneumatic interface assembly.

11. The spacecraft of claim 8, wherein each thruster is a Hall Effect thruster.

12. The spacecraft of claim 8, wherein:
the at least two electric thrusters are configured to accelerate ions generally along a thrust vector aligned with a first direction; and
the mounting arrangement is configured to conduct a first portion of waste heat from a mounting plate of each thruster to a surface of the mounting arrangement that is approximately parallel to the thrust vector such that the first portion of the waste heat is radiated to space in a direction approximately transverse to the thrust vector.

13. The spacecraft of claim 12, wherein:
the mounting arrangement is configured to provide a view to space from a back side of the thruster such that a second portion of the waste heat is radiated to space in a direction generally opposite to the thrust vector.

14. The spacecraft of claim 8, wherein a normal to the plane of rotation is approximately orthogonal to a line between extending from the proximal portion of the mounting arrangement to the distal portion of the mounting arrangement.

15. The spacecraft of claim 8, wherein the pneumatic interface assembly is disposed between the electrical interface assembly and the pointing arrangement.

16. The spacecraft of claim 8, wherein the electrical interface assembly is disposed between the pneumatic interface assembly and the pointing arrangement.

17. A method comprising:
operating an orbiting spacecraft, the spacecraft including a propulsion subsystem, a power subsystem and an attitude control subsystem, the propulsion subsystem including:
at least two electric thrusters, each having a full power rating of at least 4000 watts;
an electrical interface assembly that couples electrical conductors from the thrusters to a spacecraft harness;
a pneumatic interface assembly that receives propellant from propellant tankage on the spacecraft and controls flow rate of the propellant to the thrusters; and
an articulable thruster support module (TSM), the TSM including a, pointing arrangement and a mounting arrangement, the mounting arrangement including a proximal portion, a distal portion and one or more heat transfer limiting features; and
performing an orbit transfer maneuver by simultaneously firing the at least two electric thrusters for a period of time not less than ten minutes at the full power rating and a duty cycle greater than 50%; wherein:
the at least two electric thrusters are disposed on the distal portion of the mounting arrangement; and
the one or more heat transfer limiting features are configured such that, while performing the orbit transfer maneuver upper temperature limits of the pneumatic interface assembly and electrical interface assembly are not exceeded.

18. The method of claim 17, wherein:
a proximal portion of the mounting arrangement is coupled with the pointing arrangement;
the electrical interface assembly and the pneumatic interface assembly are disposed on the proximal portion of the mounting arrangement;
the pointing arrangement includes at least one revolute joint configured to articulate the mounting arrangement in a plane of rotation over a range of motion about a first axis of at least 90 degrees; and the heat transfer limiting features include one or more of
(a) a coupling arrangement configured to limit heat transfer between the distal portion of the mounting arrangement and the proximal portion of the mounting arrangement (b) one or more standoffs, each standoff mechanically coupling the proximal portion of the mounting arrangement with the electrical interface assembly or the pneumatic interface assembly.

19. The method of claim 17, wherein:

the at least two electric thrusters are configured to accelerate ions generally along a thrust vector aligned with a first direction;

the mounting arrangement is configured to conduct a first portion of waste heat from a mounting plate of each thruster to a surface of the mounting arrangement that is approximately parallel to the thrust vector such that the first portion of the waste heat is radiated to space in a direction approximately transverse to the thrust vector; and the mounting arrangement is configured to provide a view to space from a back side of the thruster such that a second portion of the waste heat is radiated to space in a direction generally opposite to the thrust vector.

* * * * *

UNITED STATES PATENT AND TRADEMARK OFFICE
CERTIFICATE OF CORRECTION

PATENT NO. : 11,155,368 B1  
APPLICATION NO. : 15/920294  
DATED : October 26, 2021  
INVENTOR(S) : Lenny Low et al.

Page 1 of 1

It is certified that error appears in the above-identified patent and that said Letters Patent is hereby corrected as shown below:

In the Claims

In Line 16 of Claim 1 (Column 8, Line 44) change "wherein: the at east two electric thrusters are disposed" to --wherein: the at least two electric thrusters are disposed--.

Signed and Sealed this
Twenty-fourth Day of January, 2023

Katherine Kelly Vidal
*Director of the United States Patent and Trademark Office*